US008365857B2

(12) United States Patent
Okamoto et al.

(10) Patent No.: US 8,365,857 B2
(45) Date of Patent: Feb. 5, 2013

(54) AIRBAG SYSTEM

(75) Inventors: Yutaka Okamoto, Wako (JP); Eric Drake, Plain City, UT (US); Bengt Pipkorn, Savedalen (SE)

(73) Assignees: Honda Motor Co., Ltd., Tokyo (JP); Autoliv ASP, Inc., Ogden, UT (US)

( * ) Notice: Subject to any disclaimer, the term of this patent is extended or adjusted under 35 U.S.C. 154(b) by 204 days.

(21) Appl. No.: 12/789,700

(22) Filed: May 28, 2010

(65) Prior Publication Data
US 2011/0291391 A1 Dec. 1, 2011

(51) Int. Cl.
*B60R 21/34* (2011.01)
*B60R 21/36* (2011.01)

(52) U.S. Cl. ...................... 180/274; 280/728.2
(58) Field of Classification Search ............ 180/274, 180/271; 280/728.2; *B60R 21/34, 21/36*
See application file for complete search history.

(56) References Cited

U.S. PATENT DOCUMENTS

| 7,712,775 | B2 * | 5/2010 | Sato et al. | 280/730.2 |
|---|---|---|---|---|
| 7,862,078 | B2 * | 1/2011 | Yokota | 280/730.2 |
| 7,988,183 | B1 * | 8/2011 | Okamoto et al. | 280/728.2 |
| 8,186,472 | B2 * | 5/2012 | Okamoto et al. | 180/274 |
| 2002/0084630 | A1 * | 7/2002 | Aulbach | 280/728.2 |
| 2005/0134021 | A1 * | 6/2005 | Acker et al. | 280/728.2 |
| 2010/0252351 | A1 * | 10/2010 | Okamoto et al. | 180/274 |

FOREIGN PATENT DOCUMENTS

| JP | 2002-283939 | | 10/2002 |
|---|---|---|---|
| JP | 2006-282105 | | 10/2006 |
| JP | 2011235813 A | * | 11/2011 |
| JP | 2011235814 A | * | 11/2011 |
| JP | 2011240728 A | * | 12/2011 |
| WO | WO 2009/066660 A1 | * | 5/2009 |

\* cited by examiner

*Primary Examiner* — Paul N Dickson
*Assistant Examiner* — Joselynn Y Sliteris
(74) *Attorney, Agent, or Firm* — Rankin, Hill & Clark LLP

(57) ABSTRACT

In an airbag system, an airbag obtained by closing each of opposite end portions of a folded metal tube with an end cap is attached to an attachment surface of a front pillar, and the airbag is deployed along the front pillar with a gas produced by an inflator. Therefore, a pedestrian who collides with the front pillar can be protected by the airbag. Since the portion of the airbag, which is away from the end cap toward an intermediate part of the airbag in a longitudinal direction of the airbag by a predetermined distance, is connected to the attachment surface, which is located outside the end cap in the longitudinal direction of the airbag, with a stay being interposed in between, the difficulty in an inflation in a part of the airbag in the vicinity of each end cap, due to the end cap being pressed against the attachment surface when the airbag is inflating, is prevented. Accordingly, the airbag is allowed to inflate uniformly throughout the entire length of the airbag, and the intermediate part of the airbag in the longitudinal direction of the airbag is prevented from bending in a way that the intermediate part thereof moves away from the attachment surface of the front pillar; thus, a portion of the airbag which is located inward in the bending direction is prevented from being buckled. Accordingly, the deployed shape of the airbag can be stabilized, and thus the shock absorbing capability of the airbag is enhanced.

10 Claims, 9 Drawing Sheets

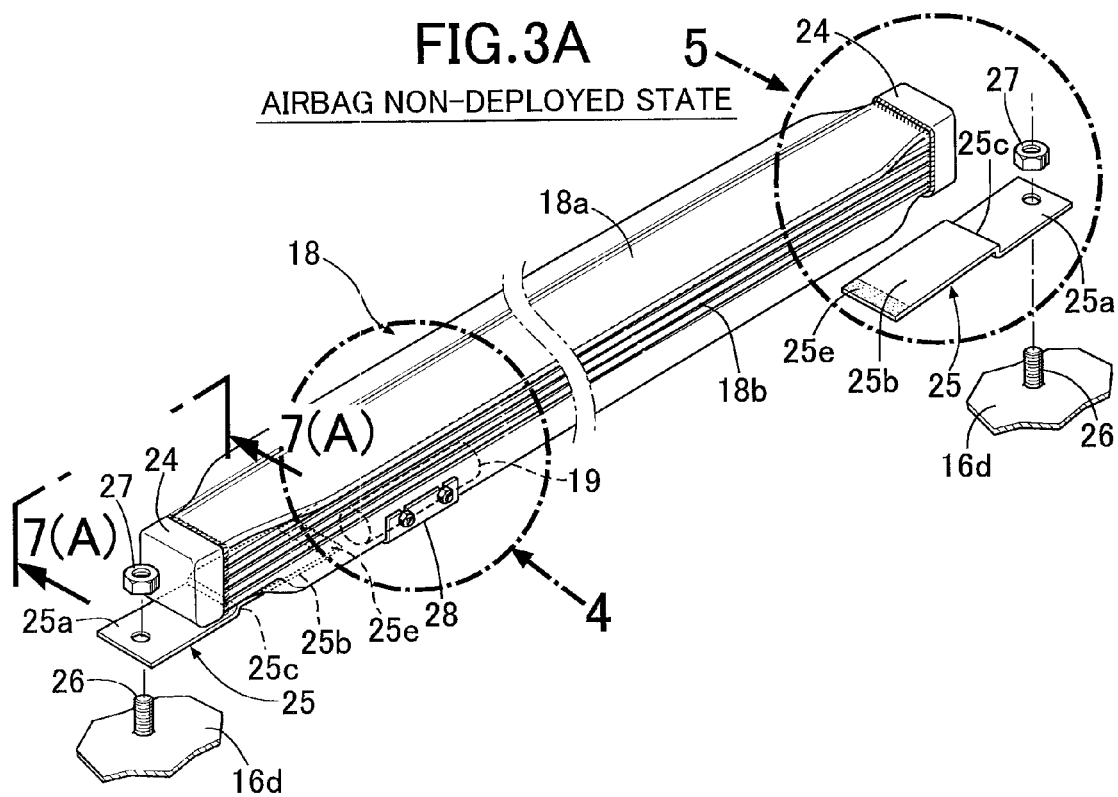
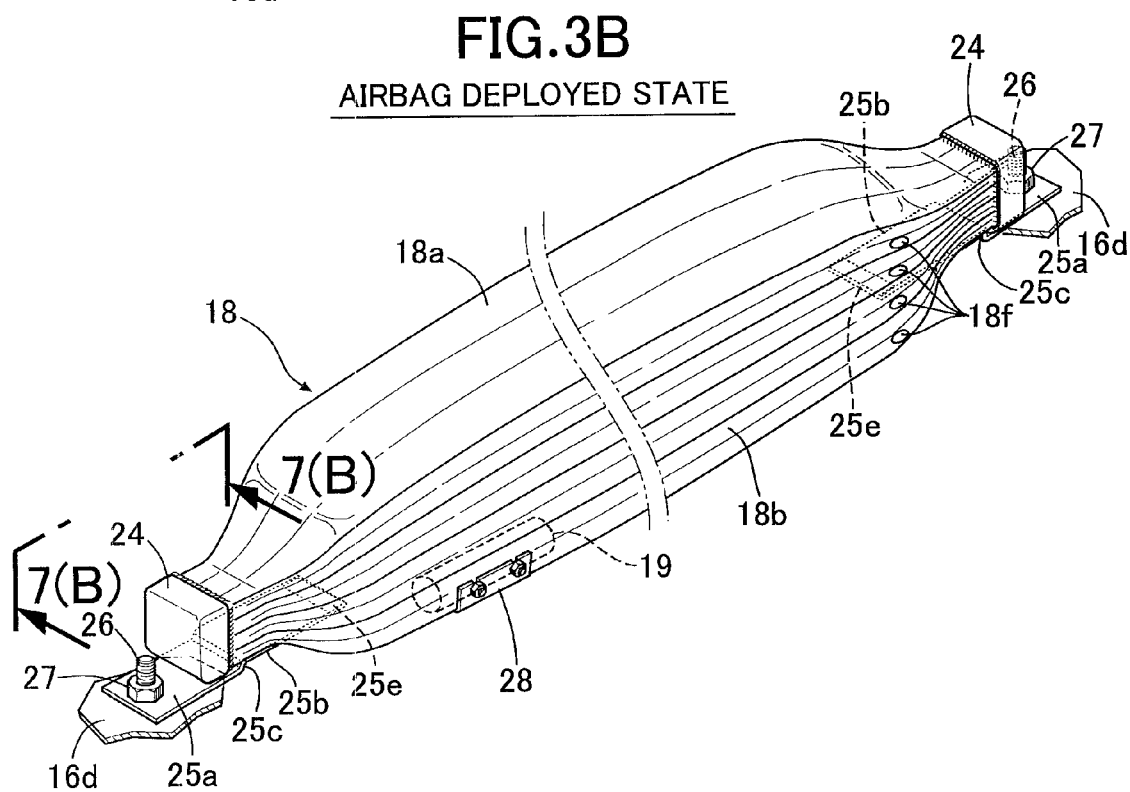

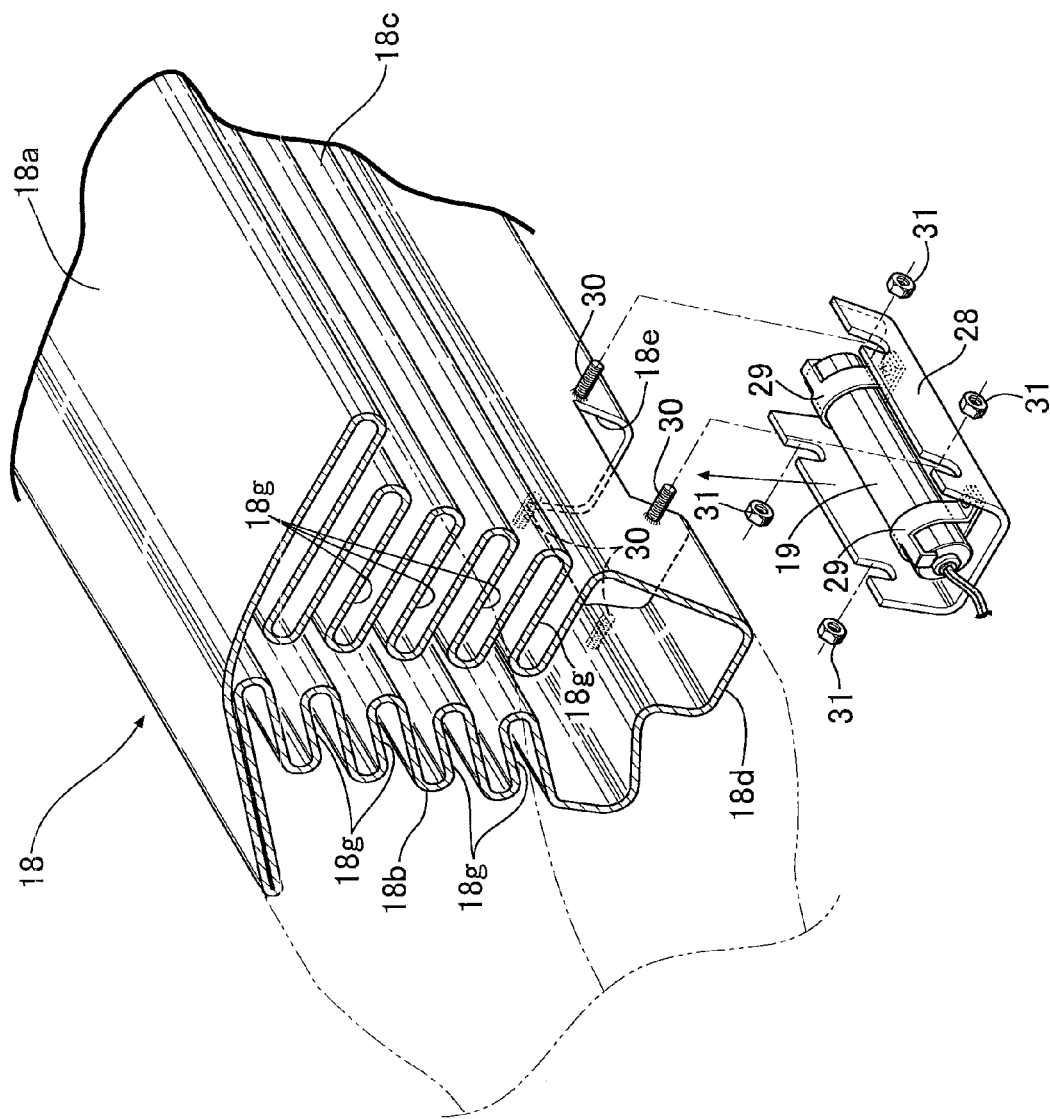

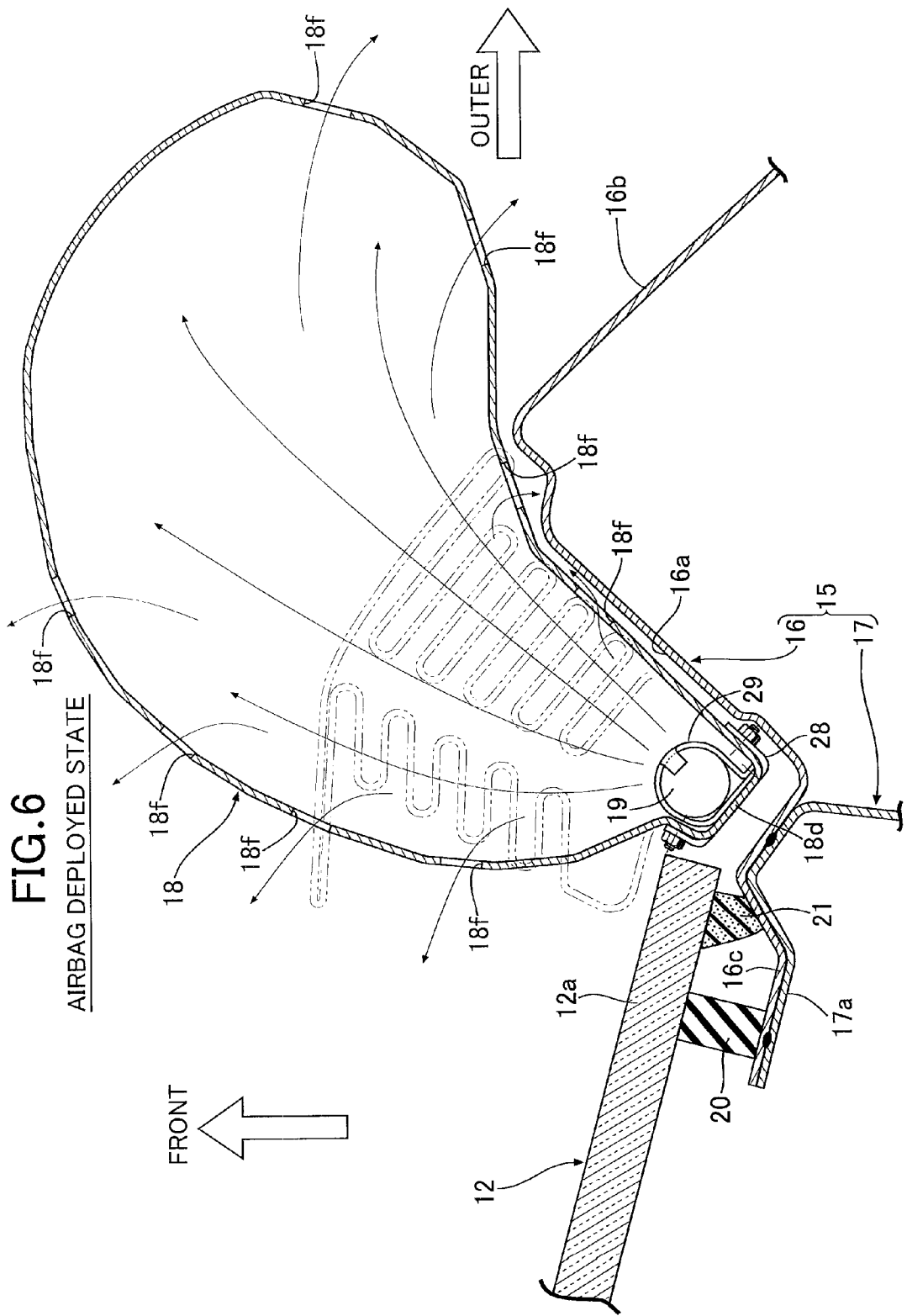

CONVENTIONAL EXAMPLE

AIRBAG SYSTEM

BACKGROUND OF THE INVENTION

1. Field of the Invention

The present invention relates to an airbag system comprising an airbag obtained by closing each of opposite end portions of a folded tubular metal tube with an end cap and attached to an attachment surface of a front pillar, the airbag system protecting a pedestrian by deploying the airbag along the front pillar with a gas produced by an inflator.

2. Description of the Related Art

Japanese Patent Application Laid-open No. 2002-283939 has made publicly known an airbag system for protecting a pedestrian which is configured so that: a folded airbag made of cloth is stored inside a pillar garnish for covering a front surface of a front pillar of an automobile; in collision with a pedestrian, a gas produced by an inflator is supplied to the airbag, and thus deploys the airbag along the front surface of the front pillar from a rip which is made when the pillar garnish breaks; and the pedestrian is protected with the airbag thus deployed.

In addition, Japanese Patent Application Laid-open No. 2006-282105 has made publicly known a shock absorbing structure for protecting a pedestrian which is configured so that: a pillar garnish for covering a front surface of a front pillar of an automobile is supported by a pillar skeletal member with a link-type pillar driving mechanism being interposed in between; in collision with a pedestrian, the pillar driving mechanism lifts the pillar garnish up from the pillar skeletal member so as to allow the pillar garnish to make stroke motions; and the pillar garnish thus absorbs the collision energy.

In the case of the invention disclosed in Japanese Patent Application Laid-open No. 2002-283939, however, it is difficult to keep the airbag deployed for a long time because the airbag is made of cloth; therefore, the airbag may not fully exhibit its shock absorbing effects depending on timing at which the pedestrian collides with the front pillar.

In the meantime, the invention disclosed in Japanese Patent Application Laid-open No. 2006-282105 has a problem that: the structure of the link-type pillar driving mechanism for movably supporting the pillar garnish with the pillar skeletal member is complicated; thus, the number of parts increases, and the cost increases.

Against this background, through Japanese Patent Application No. 2009-224381, the present applicant has already proposed an airbag system which is configured so that: instead of the conventional airbag made of cloth, an airbag made of metal is folded and arranged in a front pillar; and a gas produced by an inflator deploys this airbag toward the outside of a vehicle body.

The airbag of this airbag system is obtained by closing both end portions of a folded metal tube with respective end caps. These end caps are fixed to an attachment surface of the front pillar with bolts. Therefore, when the airbag inflates due to the gas produced by the inflator, the end caps at the respective end portions are incapable of moving in a direction away from the attachment surface of the front pillar. As a result, it is likely that: the airbag may inflate insufficiently because the both end portions of the airbag interfere with the attachment surface; and a stable deployed shape of the airbag may not be obtained because a middle part of the airbag in a longitudinal direction thereof, which is opposed to the attachment surface, is compressed and thus buckled as a result of the airbag inflating while being bent in such a shape that the middle part of the airbag in the longitudinal direction thereof moves away from the attachment surface of the front pillar.

SUMMARY OF THE, INVENTION

The present invention has been made in consideration of the above-described situation. An object of the present invention is to stabilize the deployed shape of a metal pedestrian airbag.

In order to achieve the above object, according to a first feature of the present invention, there is provided an airbag system comprising an airbag obtained by closing each of opposite end portions of a folded metal tube with an end cap and attached to an attachment surface of a front pillar, the airbag system protecting a pedestrian by deploying the airbag along the front pillar with a gas produced by an inflator, wherein the airbag is attached to the attachment surface by connecting a portion of the airbag to the attachment surface with a stay interposed therebetween, said portion being located away from the end cap towards an intermediate part of the airbag by a predetermined distance in a longitudinal direction of the airbag, the attachment surface located outside the end cap in the longitudinal direction of the airbag.

According to the aforementioned configuration, the airbag obtained by closing each of the opposite end portions of the folded metal tube with the end cap is attached to the attachment surface of the front pillar, and the airbag is deployed along the front pillar with the gas produced by the inflator. Therefore, a pedestrian who collides with the front pillar can be protected by the airbag. Since the portion of the airbag, which is away from the end cap toward an intermediate part of the airbag in the longitudinal direction of the airbag by the predetermined distance, is connected to the attachment surface, which is located outside the end cap in the longitudinal direction of the airbag, with the stay being interposed in between, the difficulty in an inflation in a part of the airbag in the vicinity of each end cap, due to the end cap being pressed against the attachment surface when the airbag is inflating, is prevented. Accordingly, the airbag is allowed to inflate uniformly throughout the entire length of the airbag, and the intermediate part of the airbag in the longitudinal direction of the airbag is prevented from bending in a way that the intermediate part thereof moves away from the attachment surface of the front pillar; thus, a portion of the airbag which is located inward in the bending direction is prevented from being buckled. Accordingly, the deployed shape of the airbag can be stabilized, and thus the shock absorbing capability of the airbag is enhanced.

In addition, by extending each stay outward beyond the corresponding end cap, the airbag can be attached to the attachment surface of the front pillar from the outside of the vehicle body.

According to a second feature of the present invention, in addition to the first feature, there is provided the airbag system, wherein the predetermined distance is not less than a half of a diameter of the airbag after being deployed.

According to the foregoing configuration, since the distance between the location in which the corresponding stay is fixed to the airbag and the end cap is set not less than a half of the diameter of the airbag after being deployed, the part of the airbag in the vicinity of each end cap can be securely inflated.

According to a third feature of the present invention, in addition to the second feature, there is provided the airbag system, wherein the predetermined distance is substantially equal to the diameter of the airbag after being deployed.

According to the aforementioned configuration, since the distance between the position in which the corresponding stay is fixed to the airbag and the end cap is set substantially equal to the diameter of the airbag after being deployed, the part of the airbag in the vicinity of each end cap can be inflated more securely.

According to a fourth feature of the present invention, in addition to any one of the first to third features, there is provided the airbag system, wherein the stay is formed in a crank shape and includes: a first fixation part fixed to the attachment surface; a second fixation part fixed to the airbag; and a connecting part connecting the first and second fixation parts together, and the end cap is opposed to the first fixation part.

According to the aforementioned configuration, since the stay includes: the first fixation part fixed to the attachment surface; the second fixation part fixed to the airbag; and the connecting part connecting the first and second fixation parts together, and is formed in a crank shape; and the end cap is opposed to the first fixation part, the airbag can be fixed reliably while each stay is prevented from interfering with the corresponding end cap.

According to a fifth feature of the present invention, in addition to the fourth feature, there is provided the airbag system, wherein the stay is formed by a strip-shaped metal plate, and bent flanges are formed respectively along opposite side edges of the stay.

According to the aforementioned configuration, the stay is made into a crank shape by the strip-shaped metal plate. Therefore, the stay can be manufactured easily. In addition, the bent flanges are formed along the respective opposite side edges of the stay; therefore, the rigidity of each stay is increased. Accordingly, the airbag can be fixed tightly.

The above description, other objects, characteristics and advantages of the present invention will be clear from detailed descriptions which will be provided for the preferred embodiments referring to the attached drawings.

BRIEF DESCRIPTION OF THE DRAWINGS

FIGS. 1 to 7B show a first embodiment of the present invention:

FIG. 1 is a plan view of a front part of a vehicle body of an automobile;

FIG. 2 is an enlarged cross-sectional view taken along a line 2-2 in FIG. 1;

FIG. 3A is a perspective view of an airbag in a non-deployed state;

FIG. 3B is a perspective view of the airbag in a deployed state;

FIG. 4 is an enlarged and exploded perspective view of a part indicated by an arrow 4 in FIG. 3A;

FIG. 5 is an enlarged perspective view of a part indicated by an arrow 5 in FIG. 3A;

FIG. 6 is a view corresponding to FIG. 2 and explaining an operation when the airbag deploys;

FIG. 7B is a cross-sectional view taken along a line 7(B)-7(B) in FIG. 3B.

DESCRIPTION OF THE PREFERRED EMBODIMENTS

A first embodiment of the present invention will be described below based on FIGS. 1 to 7B.

Figure 1:
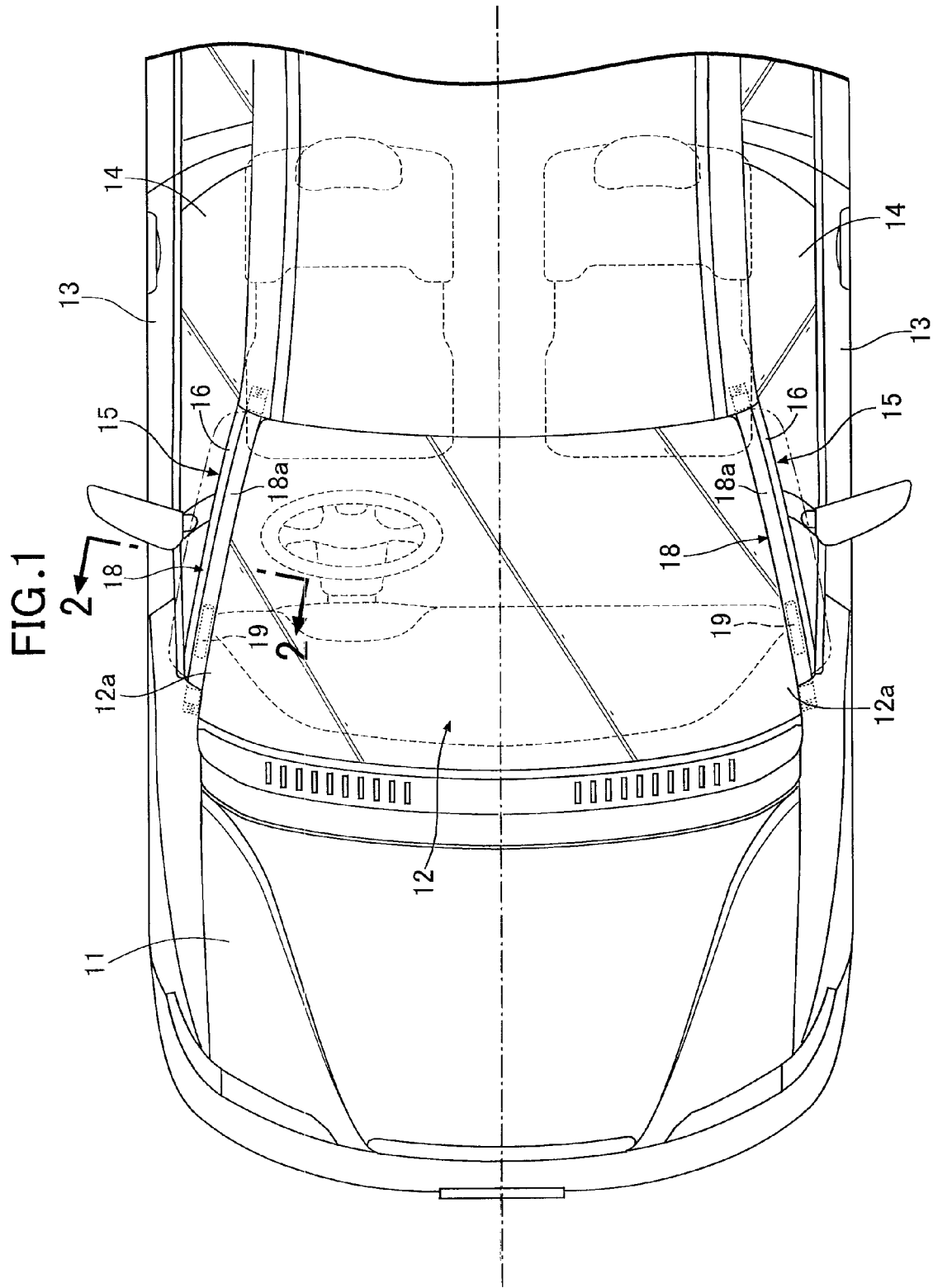

As shown in FIG. 1, an automobile has a front windshield 12 in the rear of a hood 11, and front pillars 15, 15 are arranged in a way that the front pillars 15, 15 are interposed between left and right edge portions 12a, 12a of the front windshield 12 and door glasses 14, 14 of front doors 13, 13, respectively.

Figure 2:
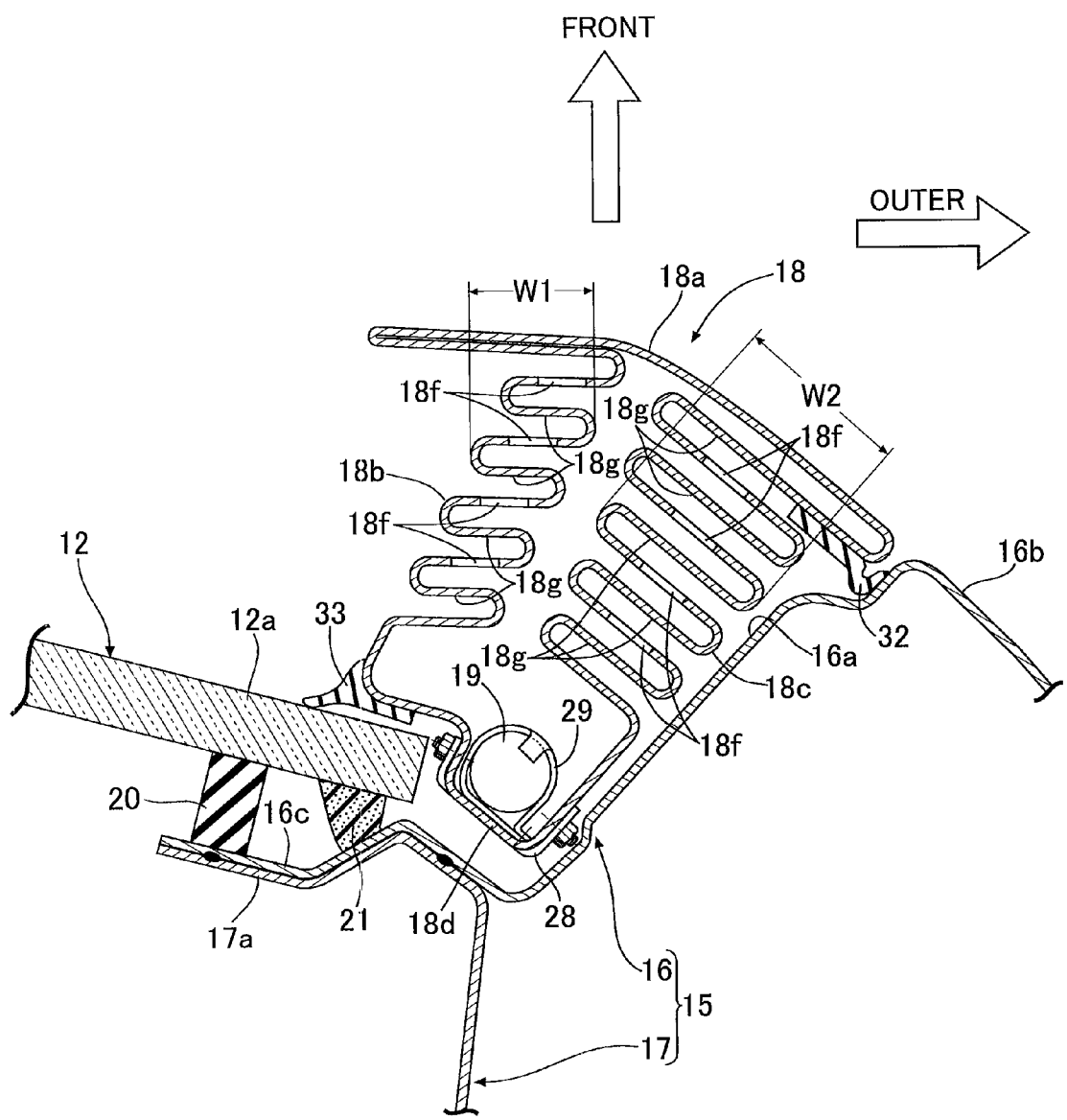
Figure 5:
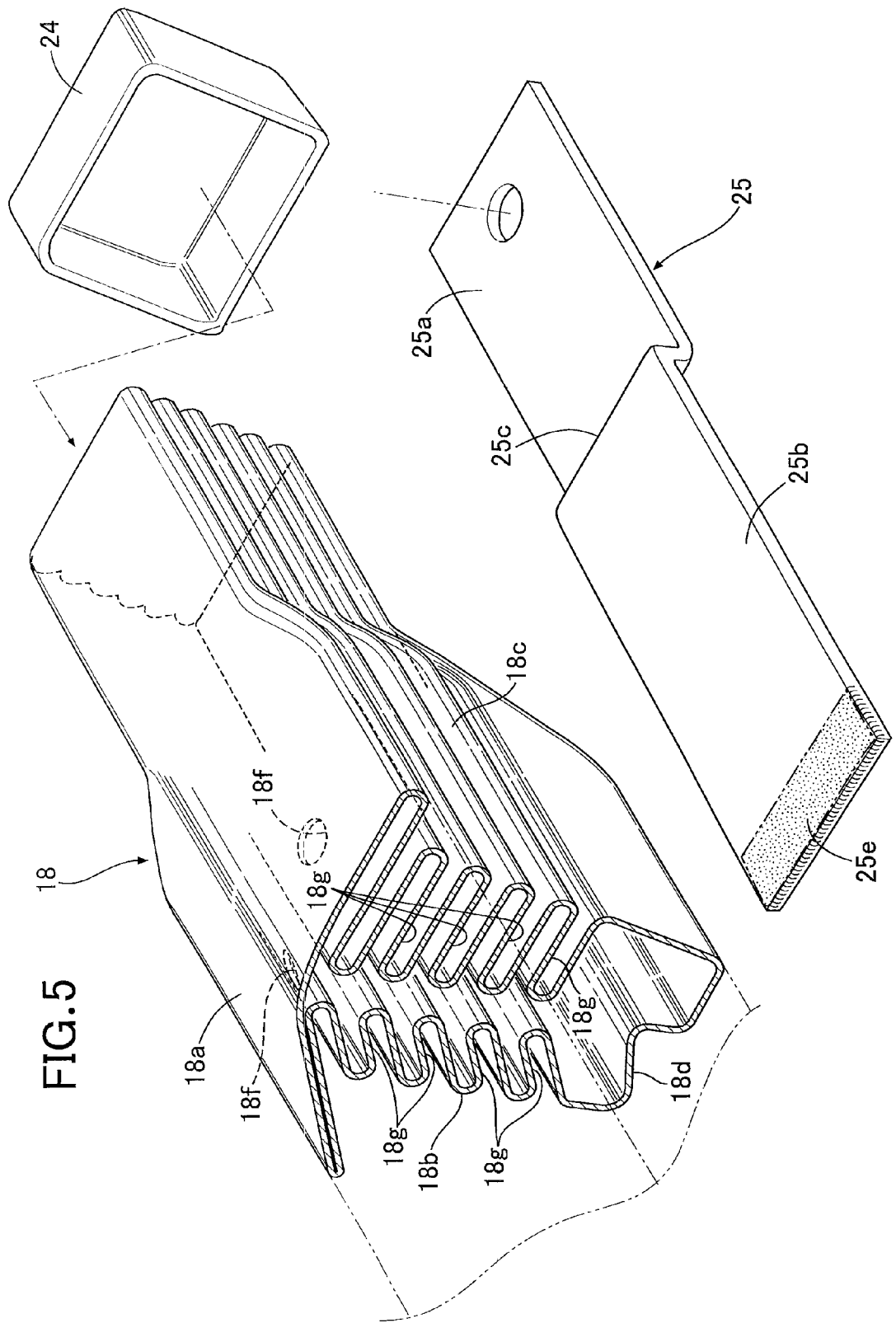

As shown in FIG. 2, the front pillar 15 is formed in a closed cross section by bonding together an outer panel 16 situated in an outer side of a vehicle body and an inner panel 17 situated in an inner side of the vehicle body. An airbag 18 made of metal, which also serves as a pillar garnish, is folded and arranged in front of a front surface 16a of the outer panel 16. The corresponding edge portion 12a of the front windshield 12 is adhered to front faces of joint sections 16c, 17a of the outer panel 16 and the inner panel 17, respectively, with an adhesive 21 with a dam rubber 20 being interposed in between.

The airbag 18 obtained by folding a tube-shaped metal tube includes a garnish part 18a, a windshield-side folded part 18b, an outer panel-side folded part 18c and an inflator supporting part 18d. The garnish part 18a smoothly extends from a side surface 16b of the outer panel 16 of the front pillar 15 toward the front windshield 12, and functions as a pillar garnish arranged between the outer panel 16 and the front windshield 12.

The windshield-side folded part 18b and the outer panel-side folded part 18c are each folded in an accordion shape behind (in the rear of) the garnish part 18a for the purpose of securing the expansion margin of the airbag 18 when it is deployed. At this point, a folded width W2 of the outer panel-side folded part 18c is set larger than a folded width W1 of the windshield-side folded part 18b.

As clearly observed in FIGS. 3A, 3B, 5, 7A and 7B, opposite end portions of the airbag 18 in a folded state are molded to be thinner by pressing, and end caps 24, 24 are fitted and welded to the respective opposite end portions. Thereby, the opposite end portions of the airbag 18 are sealed hermetically. Note that the width of the airbag 18 in the folded state may be uniform throughout the entire length of the airbag 18.

Vicinities of the respective opposite end portions of the airbag 18 are fixed to an attachment surface 16d of the outer panel 16 of the front pillar 15 with a pair of stays 25, 25. Each stay 25 is obtained by bending a strip-shaped metal plate in a crank shape, and includes: a first fixation part 25a configured to be fixed to the attachment surface 16d of the outer panel 16 with a stud bolt 26 and a nut 27; a second fixation part 25b configured to be welded to the windshield-side folded part 18b of the airbag 18 with a weld part 25e; and a connecting part 25c configured to connect the first and second fixation parts 25a, 25b together. The connecting part 25c arises at a location near an open end of the end cap 24, and the first fixation part 25a faces a side surface of the end cap 24. Thereby, the connecting part 25c cancels out the thickness of the end cap 24. Accordingly, the airbag 18 can be compactly fixed to the attachment surface 16d so as to extend along the attachment surface 16d.

A distance L between the weld part 25e, in which the second fixation part 25b of the stay 25 is welded to the windshield-side folded part 18b of the airbag 18, and the open end of the end cap 24 is set equal to or larger than a half of a diameter D (for instance, 100 mm) of the airbag 18 after being deployed. It is desirable that the distance L should be set equal to the diameter D.

As clear from FIGS. 2 to 4, an inflator 19 configured to produce a gas for deploying the airbag 18 is attached in a lower end portion of the inflator supporting part 18d which faces the garnish part 18a with the windshield-side folded part 18*b* and the outer panel-side folded part 18*c* interposed therebetween. The inflator 19 having a cylindrical shape is fixed to an inner surface of an attachment bracket 28 having an U-shape cross section with two fastening devices 29, 29. This attachment bracket 28 is overlaid an opening 18*e* formed in the inflator supporting part 18*d* of the airbag 18 from outside and fixed to the inflator supporting part 18*d* with bolts 30 and nuts 31.

As clear from FIG. 2, an outer panel-side lip 32 is arranged in a boundary between the garnish part 18*a* and the outer panel-side folded part 18*c* of the airbag 18. This outer panel-side lip 32 is configured to be in contact with the front surface 16*a* of the outer panel 16. A windshield-side lip 33 is installed in a boundary between the windshield-side folded part 18*b* and the inflator supporting part 18*d* of the airbag 18. This windshield-side lip 33 is configured to be in contact with a front surface of the edge portion 12*a* of the front windshield 12. The outer panel-side lip 32 and the windshield-side lip 33 block rainwater and the like from entering the inflator supporting part 18*d* side of the airbag 18; therefore, the inflator 19 can be protected.

As clearly indicated in FIGS. 2 and 3B, multiple vent holes 18*f* are formed in a vicinity of an end portion (for instance, an upper portion) of the airbag 18. The vent holes 18*f* are formed in flat parts 18*g* located in the accordion-folded part of the windshield-side folded part 18*b* and the outer panel-side folded parts 18*c*. At the same time, the vent holes 18*f* are arranged in a way that no vent holes 18*f*, 18*f* are formed in the corresponding locations of two opposing flat parts 18*g*, 18*g*, in other words, in a way that each two neighboring vent holes 18*f*, 18*f* do not overlap each other.

Next, descriptions will be provided for an operation of the embodiment of the present invention including the foregoing configuration.

In a normal time when the airbag 18 is not deployed, the garnish part 18*a* of the airbag 18 smoothly extends toward the side surface 16*b* of the outer panel 16 of the front pillar 15, and exhibits a pillar garnish function. Accordingly, this makes it possible to abolish a specialized pillar garnish, and thus to reduce parts in number. Furthermore, by replacing the conventional pillar garnish, the airbag 18 can be compactly installed between the front pillar 15 and the front windshield 12. Therefore, neither case nor cover is required for storing the folded airbag 18, while a good external appearance around the front pillar 15 is maintained.

Once it is detected that the vehicle has collided with a pedestrian, the inflator 19 is actuated, and an internal pressure of the airbag 18 increases due to the gas produced by the inflator 19. Then, as shown in FIG. 6, due to this increase in the internal pressure, the windshield-side folded part 18*b* and the outer panel-side folded part 18*c* of the airbag 18 which are folded in an accordion shape are first inflated toward the outside of the vehicle body, then deployed in the left and right directions in a way that the front surface 16*a* and the side surface 16*b* of the outer panel 16 of the front pillar 15 are covered.

Figure 7A:
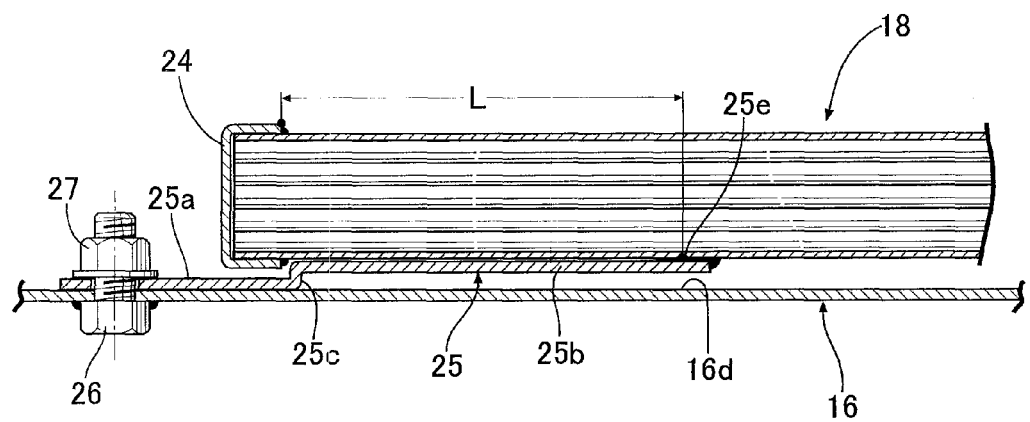
FIG. 7A is a cross-sectional view taken along a line 7(A)-7(A) in FIG. 3A.
Figure 7B:
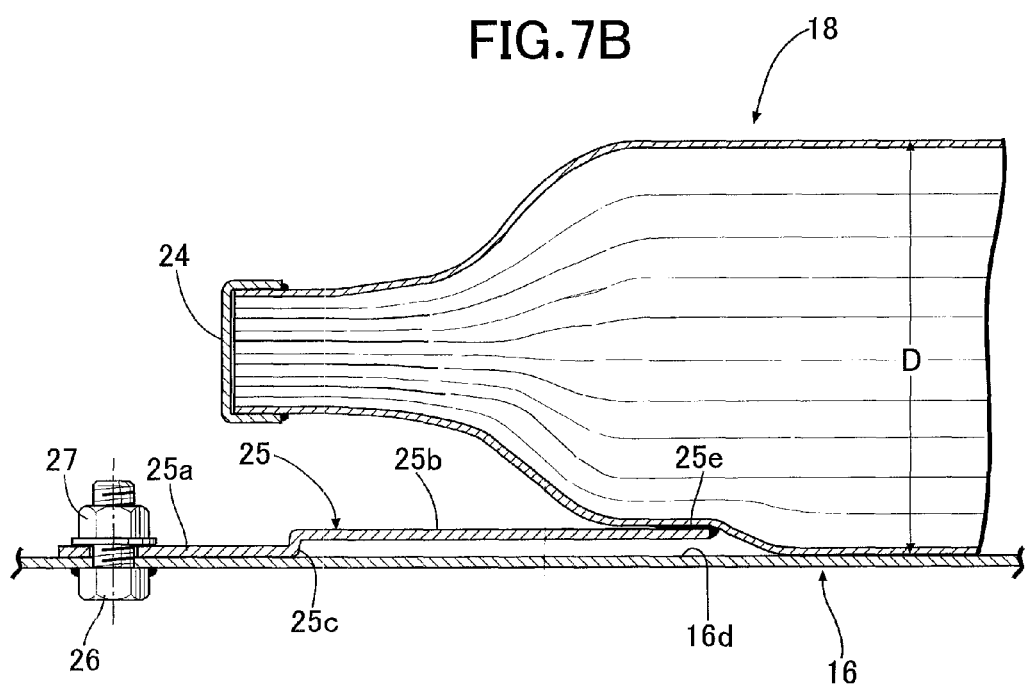

At this time, as shown in FIG. 7B, the airbag 18 is capable of freely inflating with the end caps 24, 24 being kept away from the outer panel 16*d* within a range of the distance L between the weld parts 25*e*, 25*e* and the open ends of the end caps 24, 24, respectively. This is because the positions of the airbag 18 which are away from the open ends of the end caps 24, 24 by the distance L are welded to the stays 25, 25 at the weld parts 25*e*, 25*e*, respectively. Accordingly, the airbag 18 can be deployed in such a stable shape that the diameter throughout the entire length of the airbag 18 is uniform.

Figure 9:
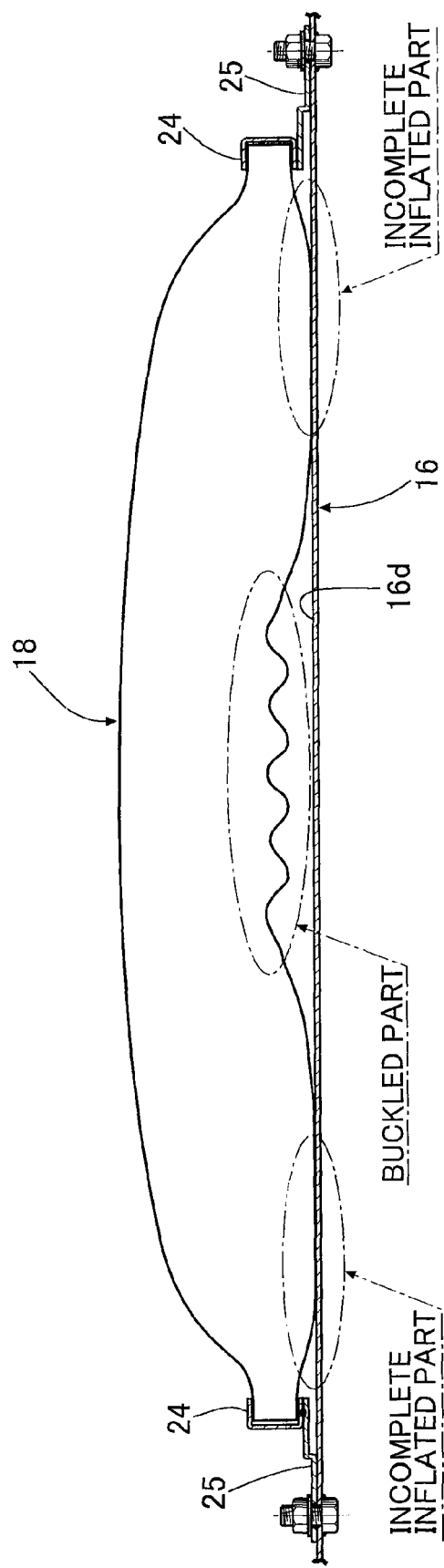
FIG. 9 is a view explaining an operation of a conventional example.

As shown in FIG. 9, if the end caps 24, 24 of the airbag 18 are directly fixed to the outer panel 16 with the stays 25, 25, the end caps 24, 24 would be incapable of moving in a direction in which the end caps 24, 24 move away from the outer panel 16. Therefore, it results not only in making the inflation of each of the opposite end portions of the airbag 18 incomplete, but also in bending an intermediate part of the airbag 18 in a longitudinal direction thereof in a way of moving away from the outer panel 16. Accordingly, a portion of the airbag 18 located inward in the bending direction would be compressed and thus buckled. Hence, the deployed shape of the airbag 18 may be unstable.

Moreover, by including the windshield-side folded part 18*b* and the outer panel-side folded part 18*c*, the airbag 18 securely makes the peripheral length thereof after being deployed longer, and thereby can cover a wider area of the front pillar 15. Accordingly, a shock absorbing capability of the airbag 18 can be enhanced. In addition, the front pillar 15 gives a larger impact on a pedestrian because the front pillar 15 is harder than the front windshield 12. However, by setting the folded width W2 of the outer panel-side folded part 18*c* larger than the folded width W1 of the windshield-side folded part 18*b*, an expansion margin (the amount of expansion) of the outer panel-side folded part 18*c* when the airbag 18 is deployed is increased, and the airbag 18 is deployed in a way that the airbag 18 is wrapped around the side surface 16*b* side of the outer panel 16. Thus, the shock absorbing capability of the airbag 18 can be further enhanced.

Furthermore, an airbag system for a pedestrian has a characteristic that time which lapses before the pedestrian collides with the front pillar 15 tends to relatively vary largely depending on the physique of the pedestrian and the velocity at which the vehicle is running at the time of collision. For this reason, a problem with a conventional airbag made of cloth is that an inflator with a large volume, which is configured to produce the gas continuously, is required for the purpose of keeping the airbag deployed for a predetermined length of time. On the contrary, the present embodiment employs the airbag 18 made of metal. Once deployed, the airbag 18 is capable of keeping the deployed state even after the supply of the gas is ended. This plastic deformation allows the airbag 18 to absorb the shock of the collision with a pedestrian. For this reason, the airbag 18 exhibits its shock absorbing capability effectively no matter what timing a pedestrian may collides with the front pillar 15 even with the inflator 19 having a smaller volume.

Furthermore, the vent holes 18*f* are formed in the flat parts 18*g* of the windshield-side folded part 18*b* and the outer panel-side folded part 18*c* of the airbag 18 which are in an accordion shape; and the positions where the vent holes 18*f* are formed are located in the vicinity of one end portion of the airbag 18 in a longitudinal direction thereof. Therefore, each two neighboring flat parts 18*g* are almost in close contact with each other in an initial stage of the deploying of the airbag 18. Thus, the vent holes 18*f* of the airbag 18 are closed by the corresponding flat parts 18*g*. This makes it possible to quickly deploy the airbag 18 while preventing unnecessary leakage of the gas from the vent holes 18*f*. Then, in the terminal stage of the deploying of the airbag 18, neighboring flat parts 18*g* move away from each other, and the vent holes 18*f* are opened. Accordingly, an excessive increase in the internal pressure can be prevented by discharging an excessive amount of gas from the vent holes 18*f*.

Figure 8:
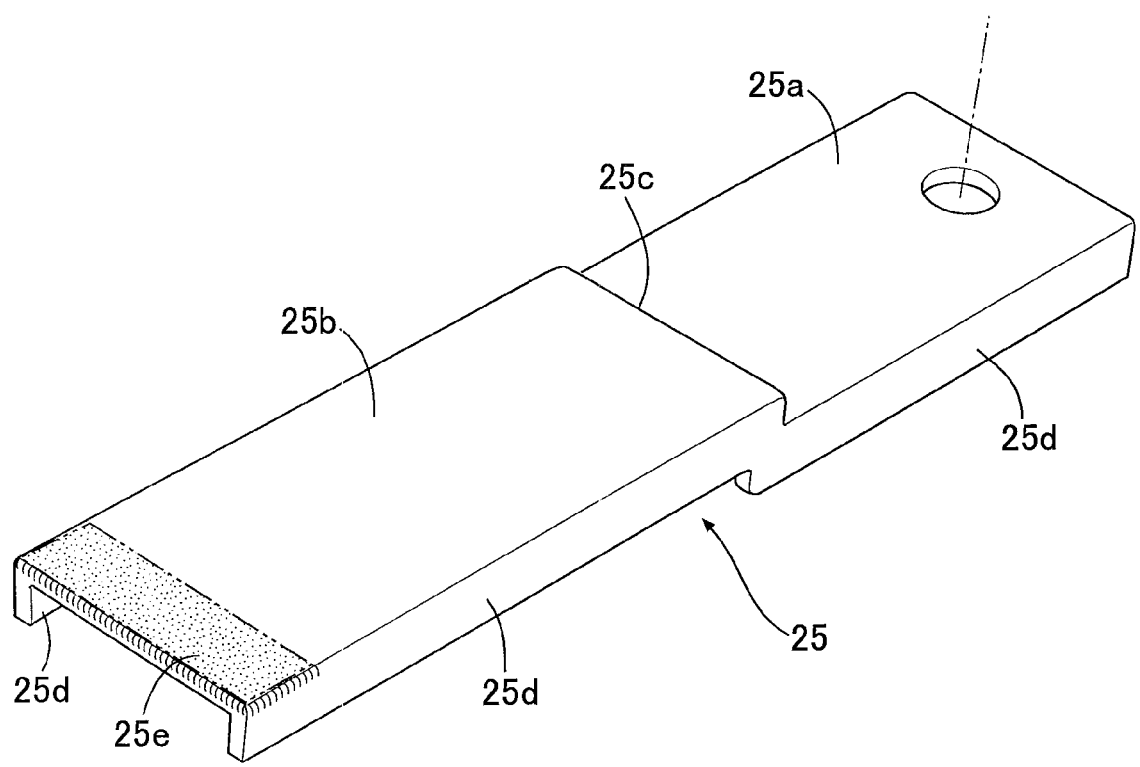
FIG. 8 is a perspective view of a stay according to a second embodiment of the present invention.

Next, descriptions will be provided for a second embodiment of the present invention based on FIG. 8.

In the second embodiment, bent flanges 25*d*, 25*d* are respectively formed along opposite side edges of a stay 25.

These bent flanges 25d, 25d are capable of increasing the rigidity of the stay 25; thus preventing deformation at the time of deploying the airbag 18; and making the deployed shape of the airbag 18 more stable.

The embodiments of the present invention have been described above. However, various design changes can be made on the present invention within the scope not departing from the gist of the present invention.

For instance, the way of folding the airbag 18 is not limited to the embodiments, and any appropriate way of folding the airbag 18 can be adopted.

What is claimed is:

1. An airbag system comprising an airbag obtained by closing each of opposite end portions of a folded metal tube with an end cap and attached to an attachment surface of a front pillar, the airbag system protecting a pedestrian by deploying the airbag along the front pillar with a gas produced by an inflator, wherein the airbag is attached to the attachment surface by connecting a portion of the airbag to the attachment surface with a stay interposed therebetween, said airbag portion being located away from the end cap towards an intermediate part of the airbag by a predetermined distance in a longitudinal direction of the airbag, the attachment surface is spaced a distance from the end cap in the longitudinal direction of the airbag, wherein:

said stay extends in the longitudinal direction of the airbag and includes a first fixation part, a second fixation part, and a connecting part, said first fixation part is fixed to the attachment surface and extends in the longitudinal direction of the airbag past the end cap and toward the second fixation part, said second fixation part is fixed to the airbag portion and extends in the longitudinal direction of the airbag toward the first fixation part, and the connecting part connects the first and second fixation parts together.

2. The airbag system according to claim 1, wherein the predetermined distance is not less than a half of a diameter of the airbag after being deployed.

3. The airbag system according to claim 2, wherein the predetermined distance is substantially equal to the diameter of the airbag after being deployed.

4. The airbag system according to claim 3, wherein
an open end of the end cap faces toward the second fixation part.

5. The airbag system according to claim 4, wherein the stay is formed by a metal plate, and bent flanges are formed respectively along opposite side edges of the stay.

6. The airbag system according to claim 2, wherein
an open end of the end cap faces toward the second fixation part.

7. The airbag system according to claim 6, wherein the stay is formed by a metal plate, and bent flanges are formed respectively along opposite side edges of the stay.

8. The airbag system according to claim 1, wherein
an open end of the end cap faces toward the second fixation part.

9. The airbag system according to claim 8, wherein the stay is formed by a metal plate, and bent flanges are formed respectively along opposite side edges of the stay.

10. The airbag system according to claim 1, wherein the front pillar comprises an outer panel that is situated on an outer side of a vehicle body and an inner panel that is situated on an inner side of the vehicle body, and the attachment surface is provided on the outer panel of the front pillar.

* * * * *